United States Patent
Etzion et al.

(10) Patent No.: US 6,604,093 B1
(45) Date of Patent: Aug. 5, 2003

(54) SITUATION AWARENESS SYSTEM

(75) Inventors: Opher Etzion, Haifa (IL); Asaf Adi, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/473,205

(22) Filed: Dec. 27, 1999

(51) Int. Cl.$^7$ .............................................. G06F 17/00
(52) U.S. Cl. .............................. 706/47; 706/45; 706/46
(58) Field of Search .............................. 706/60, 45–47; 717/139; 379/100.13; 707/201, 103 R

(56) References Cited

U.S. PATENT DOCUMENTS

| | | | |
|---|---|---|---|
| 4,866,635 A | * 9/1989 | Kahn et al. | 706/46 |
| 4,970,658 A | * 11/1990 | Durbin et al. | 706/60 |
| 4,996,707 A | * 2/1991 | O'Mailey et al. | 379/100.13 |
| 5,133,075 A | 7/1992 | Risch | 707/201 |
| 5,276,775 A | * 1/1994 | Meng | 706/51 |
| 5,412,756 A | * 5/1995 | Mauman et al. | 706/45 |
| 5,517,642 A | * 5/1996 | Bezek et al. | 707/3 |
| 5,528,516 A | 6/1996 | Yemini et al. | 702/181 |
| 5,551,027 A | * 8/1996 | Choy et al. | 707/201 |
| 5,634,100 A | 5/1997 | Capps | 705/9 |
| 5,680,602 A | 10/1997 | Bloem et al. | 707/1 |
| 5,748,098 A | 5/1998 | Grace | 370/242 |
| 5,754,737 A | * 5/1998 | Gipson | 706/11 |
| 5,822,583 A | 10/1998 | Tabuchi | 709/100 |
| 5,838,965 A | * 11/1998 | Kavanuagh et al. | 707/103 R |
| 5,872,931 A | 2/1999 | Chivaluri | 709/223 |
| 6,356,885 B2 | * 3/2002 | Ross et al. | 706/45 |
| 6,397,202 B1 | * 5/2002 | Higgins et al. | 706/47 |
| 6,529,889 B1 | * 3/2003 | Bromberg et al. | 706/45 |

OTHER PUBLICATIONS

S. Gatziu et al., "The SAMOS Active DBMS Prototype", Technical Report 94.16 of the Department of Computer Science, University of Zurich, Oct. 1994.

S, Gatziu et al., "Events in an Active Object–Oriented Database System", Proceedings of the 1st International Workshop on Rules in Database Systems, Edinburgh, UK, Aug. 1993.

D. Zimmer et al., A General Model for Specification of the Semantics of Complex Events in Active Database Management Systems, C–LAB Report Mar. 1997 (Cooperative Computing and Communication Laboratory, Paderborn, Germany).

S. Chakravarthy et al., "Snoop: An Expressive Event Specification Language for Active Databases"; Technical Report UF–CIS–TR–93–007, Department of Computer and Information Sciences, University of Florida, Dainesville, Florida, Mar., 1993.

N. Gehani et al., "COMPOSE, A System for Composite Event Specification and Detection"; Lecture Notes in Computer Science 759, Springer–Verlag, 1993, pp. 3–15. Preprint from Dec. 1992.

\* cited by examiner

*Primary Examiner*—John Follansbee
*Assistant Examiner*—Michael B. Holmes
(74) *Attorney, Agent, or Firm*—Darby & Darby

(57) ABSTRACT

A method for situation management includes specifying a composite event as a combination of two or more predefined component events and defining a rule, which causes a reaction to be invoked upon an occurrence of the composite event subject to a given condition. When at least first and second instances of the component events are received before invoking the reaction, the first instance is evaluated subject to the condition, so as to determine whether the first instance can satisfy the rule, before evaluating the second instance. Responsive to evaluating the first instance subject to the condition, it is determined that the composite event has occurred, and the reaction is invoked.

34 Claims, 10 Drawing Sheets

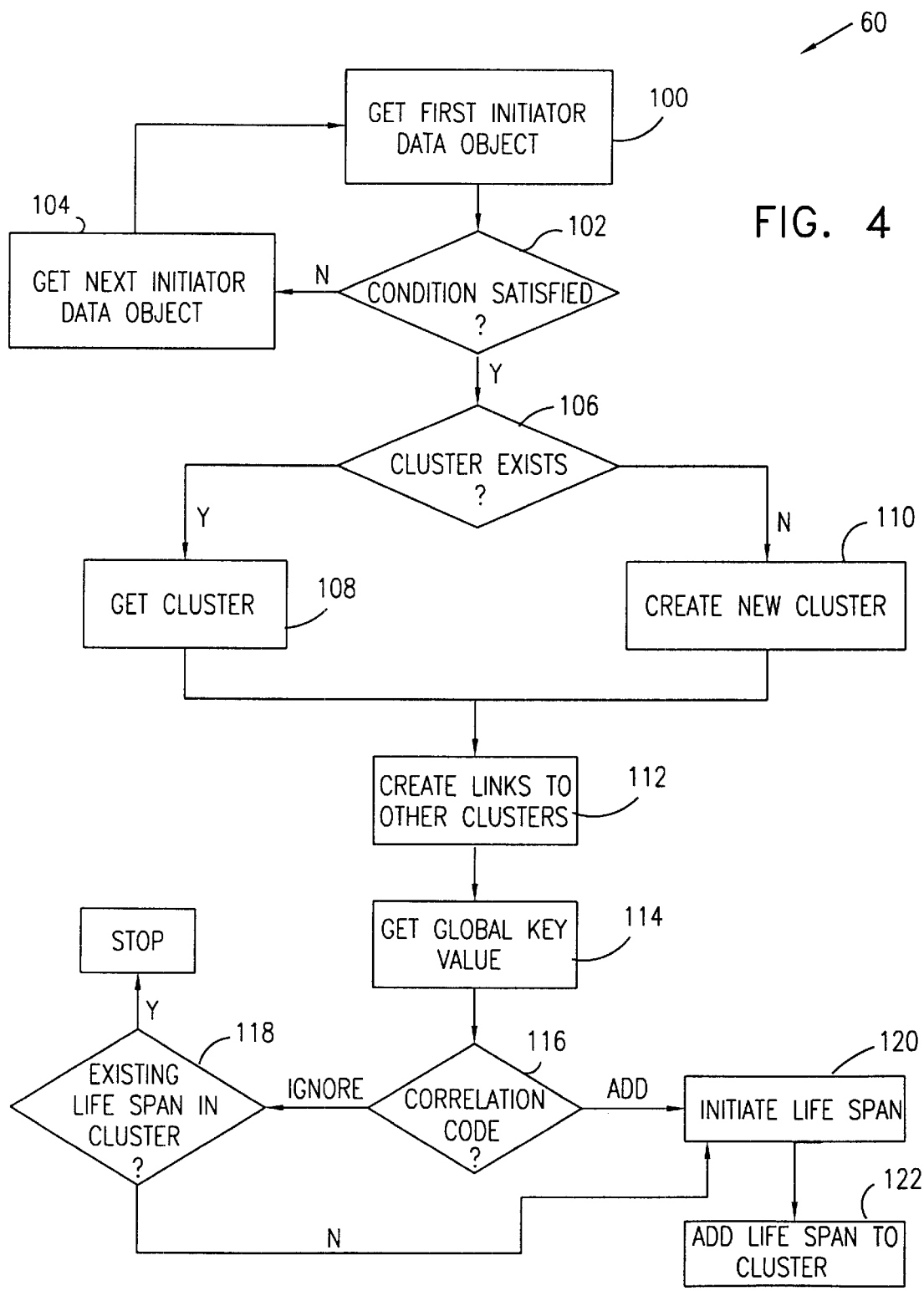

SITUATION AWARENESS SYSTEM

FIELD OF THE INVENTION

The present invention relates generally to computer systems and software, and specifically to tools and methods for programming the reaction of a computer system to specified events and conditions.

BACKGROUND OF THE INVENTION

Reactive systems is a term that is used generally to refer to computer applications that detect, evaluate and respond to events. Such events may include substantially any occurrence of interest that is detected by the computer, such as a change in the price of a stock, the beginning of a banking transaction, change of an entry in a database or a suspected fault in a computer or communication system. The timing, sequence and content of these events are generally not known in advance.

Various tools have been developed in order to allow events and their attendant reactions to be specified in a general, flexible way. Many of these tools are based on Event-Condition-Action (ECA) rules and provide a language of operators for specifying these rules. Some of these languages enable complex events to be defined as the composition of multiple simple events, for example, successive withdrawals from one or more bank accounts. Some languages also allow a complex event to be composed of a number of subsidiary complex events. In addition, a particular order or other timing constraints on the component events may be specified.

Once the complex event has been detected, there may be one or more conditions that qualify the event, for example, that the amounts of the withdrawals be greater than a specified threshold. If the conditions are satisfied, then an action is triggered, such as alerting the bank's security manager of a possible fraud. In the context of the present patent application, a specified composition of events together with the conditions attached to these events is referred to as a situation. Tools for specification of ECA rules generally make a clear separation between the event and condition portions of the rule. Thus when a computer evaluates a given situation on the basis of such tools, it first determines that an instance of the event has occurred, i.e., that all of the component events have occurred in the proper order, and only then evaluates the conditions associated with the event.

Gehani et al., in an article entitled "COMPOSE: A System for Composite Event Specification and Detection," in Lecture Notes in Computer Science 759 (Springer-Verlag, 1993), pp. 3–15, which is incorporated herein by reference, describe a reactive system in which primitive events can have attributes. The attributes may be associated with the event itself, such as a transaction ID, or they may be determined by some external condition at the time the event occurs. In specifying a rule based on such an event, a predicate (or condition) can be defined on these attributes such that, when the predicate is false, the occurrence of the event is "masked" and does not trigger an action specified by the rule.

Processing of the events when they occur is performed using a finite state machine, wherein evaluation of the conditions is done in a separate phase, after event processing has been completed.

ECA rules have received substantial research attention in the field of active database management systems. In these systems, ECA rules are attached to a database in order to monitor situations of interest that may occur in the database (or beyond the database, as appropriate), and trigger timely responses when the situations occur, even without an explicit request from a user or application. A technical report by Zimmer et al., entitled "A General Model for Specification of the Semantics of Complex Events in Active Database Management Systems," C-LAB Report March 1997 (Cooperative Computing & Communication Laboratory, Paderborn, Germany), which is incorporated herein by reference, provides a survey and critique of work in this field, including various languages that have been developed for the specification of events and ECA rules.

One such language is "Snoop," which is described by Chakravarthy et al., in a report entitled "Snoop: An Expressive Event Specification Language for Active Databases" (Tech. Report UF-CIS-TR-93–007, Department of Computer and Information Sciences, University of Florida, Gainesville, March, 1993), which is incorporated herein by reference. Snoop, like other event specification languages, defines certain event operators used for constructing complex events. The operators provided by Snoop include conjunction, disjunction and sequence, as well as "aperiodic" and "periodic" event operators. Aperiodic operators are used to express the occurrence of a particular event within an interval bounded by two or more other events. Periodic operators express the occurrence of a particular event within a specified time interval of the occurrence of a preceding event. In either case, an action may be triggered on every occurrence of the particular event, or only on the first occurrence.

SUMMARY OF THE INVENTION

It is an object of some aspects of the present invention to provide improved tools and systems for situation management.

It is a further object of some aspects of the present invention to provide tools and methods for classifying and responding to temporal relationships among events.

It is still a further object of some aspects of the present invention to provide efficient methods for processing events and conditions that occur.

In preferred embodiments of the present invention, a situation management system provides tools for defining intervals during which a given situation is meaningful and for detecting and reacting to the occurrence of the situation during such intervals. In the context of the present patent application and in the claims, an interval of this sort is referred to as a "lifespan." A lifespan begins with an initiating event, or initiator, and ends with a terminating event, or terminator. The situation management system enables manipulation of the initiator and terminator, such as by attachment of conditions to the initiating and terminating events. It also allows multiple, interrelated lifespans to run concurrently, with predefined relations between the lifespans. Thus, the situation management system enables temporal relations among events to be defined and detected simply and flexibly.

In some preferred embodiments of the present invention, composition filtering and content filtering are jointly applied to detected situations. Composition filtering refers to detection of complex events, as described hereinabove, while content filtering refers to evaluation of the conditions applied to detected events. The situation management system allows a timing relationship to be defined between composition and content filtering, unlike systems known in the art, in which event detection and condition evaluation are distinct and independent processing stages. Thus, in the present system, composition and content filtering may be performed concurrently or, alternatively, content filtering may deferred and applied to events only at the end of a lifespan in which they occur. Concurrent composition and content filtering enables the system to discard immediately events that do not meet the specified conditions, thereby reducing the computation and storage burden on the system relative to systems known in the art.

In further preferred embodiments of the present invention, quantifiers are provided so as to define how the situation management system is to respond to repeated occurrences of a given event. Preferably, the quantifiers indicate to the system whether it is to react to the first or last instance of the event in a given lifespan, or to each instance in the lifespan. The quantifiers may be applied to substantially any type of event or situation detected by the system, including both simple and complex events, as well as events that serve as lifespan initiators and terminators.

There is therefore provided, in accordance with a preferred embodiment of the present invention, a method for situation management, including:

specifying a composite event as a combination of two or more predefined component events;

defining a rule, which causes a reaction to be invoked upon an occurrence of the composite event subject to a given condition;

receiving at least first and second instances of the component events before invoking the reaction;

evaluating the first instance subject to the condition, so as to determine whether the first instance can satisfy the rule, before evaluating the second instance; and responsive to evaluating the first instance subject to the condition, determining that the composite event has occurred and invoking the reaction.

Preferably, receiving the first and second instances includes receiving instances of first and second component events of the composite event, wherein determining that the composite event has occurred includes composing the composite event using the first and second instances, subject to the given condition.

Alternatively, receiving the first and second instances includes receiving two instances of the same component event, wherein determining that the composite event has occurred includes, when the first instance does not satisfy the rule, evaluating the second instance subject to the condition and determining that the composite event has occurred responsive to evaluating the second instance.

There is also provided, in accordance with a preferred embodiment of the present invention, a method for situation management, including:

specifying a lifespan, having an initiation associated with an occurrence of an initiator event and a termination associated with an occurrence of a terminator event;

attaching a condition to at least one of the initiator and terminator events, such that at least one of the initiation and the termination of the lifespan takes place subject to the condition;

defining a rule, which causes a reaction to be invoked upon an occurrence of an invoking event during the lifespan;

receiving event instances, including at least one instance of each of the initiator event, invoking event and terminator event;

evaluating the instances of the events subject to the condition so as to determine that the invoking event has occurred during the lifespan; and responsive to evaluating the instances, invoking the reaction.

In a preferred embodiment, at least one of the initiator and terminator events is a complex event, composed of a plurality of component events.

Preferably, evaluating the instances of the events subject to the condition includes evaluating the at least one instance of the initiator event subject to the condition, so as to determine whether to begin the lifespan, before receiving the instance of the invoking event.

In a preferred embodiment, defining the rule includes specifying whether to evaluate one or more instances of the invoking event that occur during the lifespan immediately, or to evaluate the one or more instances only upon receiving the terminator event, and wherein evaluating the instances of the events subject to the condition includes deciding, responsive to the rule, when to evaluate the one or more instances of the invoking event subject to the condition. Preferably, evaluating the instances of the events subject to the condition includes, responsive to deciding to evaluate the one or more instances of the invoking event immediately, evaluating a first one of the instances of the invoking event subject to the condition before evaluating any subsequent one of the event instances.

In another preferred embodiment, receiving the instances includes receiving a plurality of instances of the initiator event, and evaluating the instances includes associating two or more respective lifespans with two or more of the plurality of initiator events, and evaluating the at least one instance of the invoking event with respect to each of the two or more lifespans.

Preferably, defining the rule includes specifying, for a case in which multiple instances of the invoking event occur during the lifespan, which of the multiple instances to evaluate. Most preferably, specifying which of the multiple instances to evaluate includes specifying that a first or last instance in the lifespan is to be evaluated or, alternatively or additionally, specifying that each of the instances is to be evaluated.

There is further provided, in accordance with a preferred embodiment of the present invention, a method for situation management, including:

specifying a lifespan, defined by an initiator event and a terminator event;

defining a rule, which causes a reaction to be invoked upon the occurrence of an interim event during the lifespan;

receiving multiple instances of the initiator event before the terminator event has occurred;

opening multiple instances of the lifespan, responsive to the multiple instances of the initiator event;

receiving an instance of the interim event;

evaluating the instance of the interim event with respect to at least two of the multiple instances of the lifespan, so as to determine that the invoking event has occurred during at least one of the instances of the lifespan; and responsive to evaluating the instance of the interim event, invoking the reaction.

Preferably, opening the multiple instances of the lifespan includes opening at least two instances of the lifespan such that the at least two instances of the lifespan are open concurrently. Further preferably, the method includes receiving an instance of the terminator event, wherein evaluating the instance of the interim event includes determining that the at least two of the instances of the lifespan are terminated by the same instance of the terminator event. Alternatively, evaluating the instance of the interim event includes determining that the at least two of the instances of the lifespan are terminated by different, respective ones of the instances of the terminator event.

In a preferred embodiment, receiving the multiple instances of the initiator event includes receiving first and second instances of the initiator event, and opening the multiple instances of the lifespan includes opening a first instance of the lifespan opened responsive to the first instance of the initiator event, and the method includes closing the first instance of the lifespan responsive to the second instance of the initiator event.

There is additionally provided, in accordance with a preferred embodiment of the present invention, situation management apparatus, including:

a memory, which stores a specification of a composite event as a combination of two or more predefined component events, and which stores a definition of a rule, which causes a reaction to be invoked upon an occurrence of the composite event subject to a given condition; and a processor, which is coupled to read the specification and the rule from the memory, and which is configured to receive at least first and second instances of the component events and, when the at least first and second instances of the component events are received before invoking the reaction, to evaluate the first instance subject to the condition, so as to determine whether the first instance can satisfy the rule, before evaluating the second condition, thus to determine that the composite event has occurred and invoke the reaction responsive thereto.

In a preferred embodiment, the memory further stores a database, and wherein at least one of the component events includes a change in a record in the database. In another preferred embodiment, the processor is configured to receive at least one of the component events via a network.

There is furthermore provided, in accordance with a preferred embodiment of the present invention, situation management apparatus, including:

a memory, which stores a specification of a lifespan, having an initiation associated with an occurrence of an initiator event and a termination associated with an occurrence of a terminator event, together with a condition attached to at least one of the initiator and terminator events, such that at least one of the initiation and the termination of the lifespan takes place subject to the condition, and which stores a definition of a rule, which causes a reaction to be invoked upon an occurrence of an invoking event during the lifespan; and a processor, which is coupled to read the specification, condition and rule from the memory, and which is configured to receive event instances, including at least one instance of each of the initiator event, the invoking event and the terminator event, and to evaluate the instances of the events subject to the condition so as to determine that the invoking event has occurred during the lifespan and invoke the reaction response thereto.

There is moreover provided, in accordance with a preferred embodiment of the present invention, situation management apparatus, including:

a memory, which stores a specification of a lifespan, defined by an initiator event and a terminator event, and which stores a definition of a rule, which causes a reaction to be invoked upon the occurrence of an interim event during the lifespan; and is a processor, which is coupled to read the specification and the definition from the memory, and which is configured to receive multiple instances of the initiator event before the terminator event has occurred and to open multiple instances of the lifespan, responsive to the multiple instances of the initiator event, and further to receive an instance of the interim event and to evaluate the instance of the interim event with respect to at least two of the multiple instances of the lifespan, so as to determine that the invoking event has occurred during at least one of the instances of the lifespan and invoke the reaction responsive thereto.

There is also provided, in accordance with a preferred embodiment of the present invention, a computer software product, including program instructions stored in a computer-readable medium, which instructions, when read by a computer, cause the computer to read a specification of a composite event as a combination of two or more pre-defined component events and to read a definition of a rule, which indicates a reaction to be invoked upon an occurrence of the composite event subject to a given condition, and which instructions further cause the computer, when it receives at least first and second instances of the component events before invoking the reaction, to evaluate the first instance subject to the condition, so as to determine whether the first instance can satisfy the rule, before evaluating the second condition, and responsive to evaluating the first instance subject to the condition, to determine that the composite event has occurred and to invoke the reaction responsive thereto.

Preferably, the product is adapted for use in active database management.

There is further provided, in accordance with a preferred embodiment of the present invention, a computer software product, including program instructions stored in a computer-readable medium, which instructions, when read by a computer, cause the computer to read a specification of a lifespan, having an initiation associated with an occurrence of an initiator event and a termination associated with an occurrence of a terminator event, and further to read a condition attached to at least one of the initiator and terminator events, such that at least one of the initiation and the termination of the lifespan is to take place subject to the condition, and also to read a definition of a rule, which indicates a reaction to be invoked upon an occurrence of an invoking event during the lifespan, and which instructions further cause the computer, when it receives event instances including at least one instance of each of the initiator event, invoking event and terminator event, to evaluate the instances of the events subject to the condition so as to determine that the invoking event has occurred during the lifespan and to invoke the reaction responsive thereto.

There is additionally provided, in accordance with a preferred embodiment of the present invention, a computer software product, including program instructions stored in a computer-readable medium, which instructions, when read by a computer, cause the computer to read a specification of a lifespan, defined by an initiator event and a terminator event, and to read a definition of a rule, which causes a reaction to be invoked upon the occurrence of an interim event during the lifespan, and which instructions further cause the computer, when it receives multiple instances of the initiator event before the terminator event has occurred, and further receives an instance of the interim event, to open multiple instances of the lifespan, responsive to the multiple instances of the initiator event, and to evaluate the instance of the interim event with respect to at least two of the multiple instances of the lifespan, so as to determine that the invoking event has occurred during at least one of the instances of the lifespan and to invoke the reaction responsive thereto.

The present invention will be more fully understood from the following detailed description of the preferred embodiments thereof, taken together with the drawings in which:

BRIEF DESCRIPTION OF THE DRAWINGS

FIG. 4 is a flow chart that schematically illustrates a method for detecting the initiation of a lifespan, in accordance with a preferred embodiment of the present invention;

DETAILED DESCRIPTION OF PREFERRED EMBODIMENTS

Figure 1:
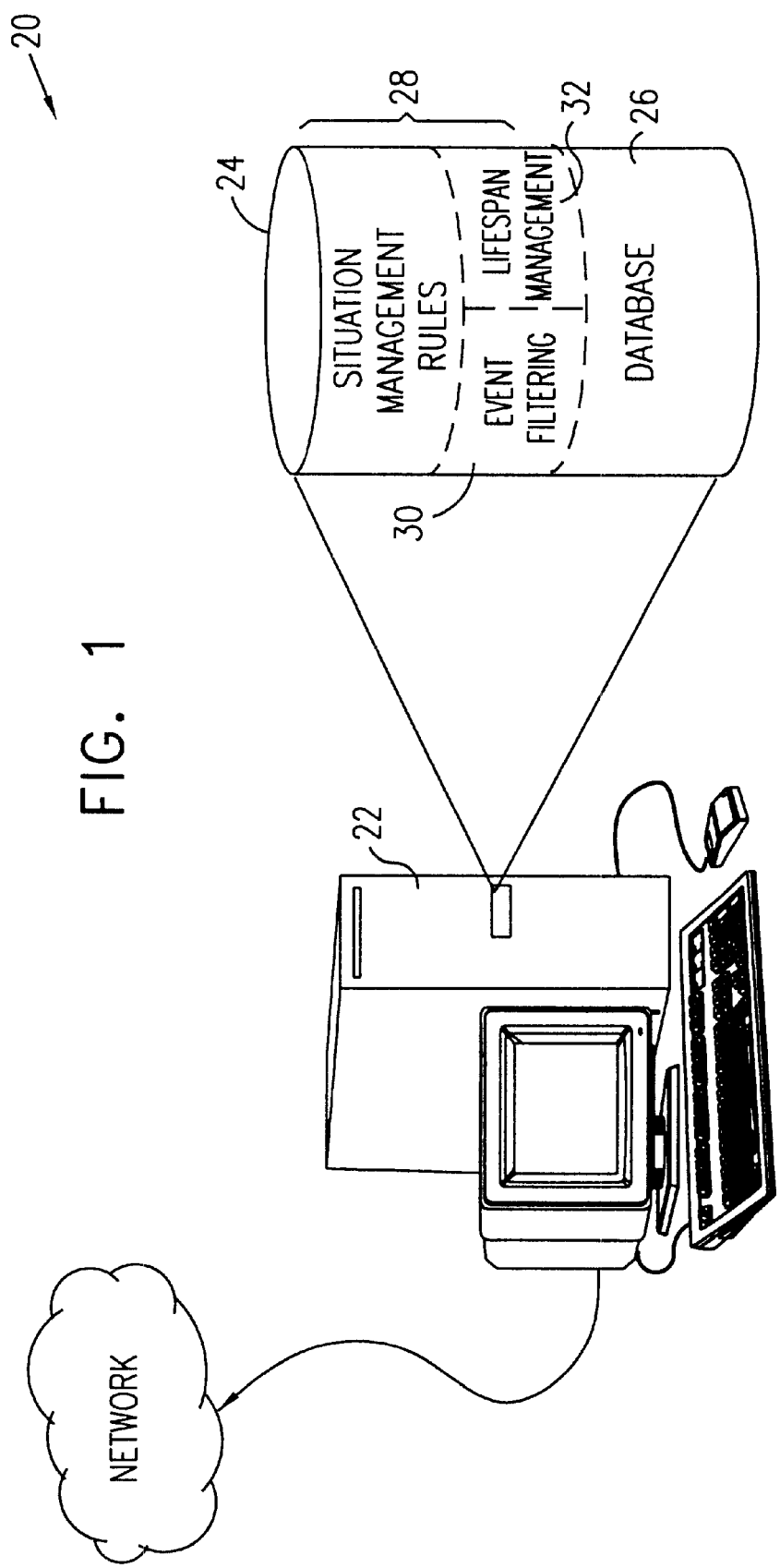
FIG. 1 is a schematic illustration of a system for situation management, in accordance with a preferred embodiment of the present invention.

FIG. 1 is a schematic illustration of a system 20 for situation management, in accordance with a preferred embodiment of the present invention. The system comprises a processor 22, typically a general-purpose computer programmed with suitable software, and a memory 24. Although memory 24 is shown in FIG. 1 as a local data store of the computer, the memory may also be maintained at a site remote from the computer, on a server or shared disk system, for example, and accessed by processor 22 via a network. Software enabling processor 22 to carry out its situation management functions may be downloaded to the processor over the network or, alternatively, it may be furnished on tangible media, such as CD-ROM.

Memory 24 stores situation management rules 28, according to which processor 22 is programmed to detect and react to situations, i.e., to specified combinations of events and conditions. These situations may arise, for example, due to changes in a database 26 maintained in memory 24. Alternatively or additionally, the situations may be associated with other events regarding which processor 22 receives notification, typically via a network connection, or with events input by a user or occurring internally to the processor. Rules 28 are defined by a user of processor 22 using rule definition operators and other situation management tools associated with system 20. These tools preferably include event filtering operators 30 and lifespan management tools 32, which are described in detail hereinbelow.

Figure 2:
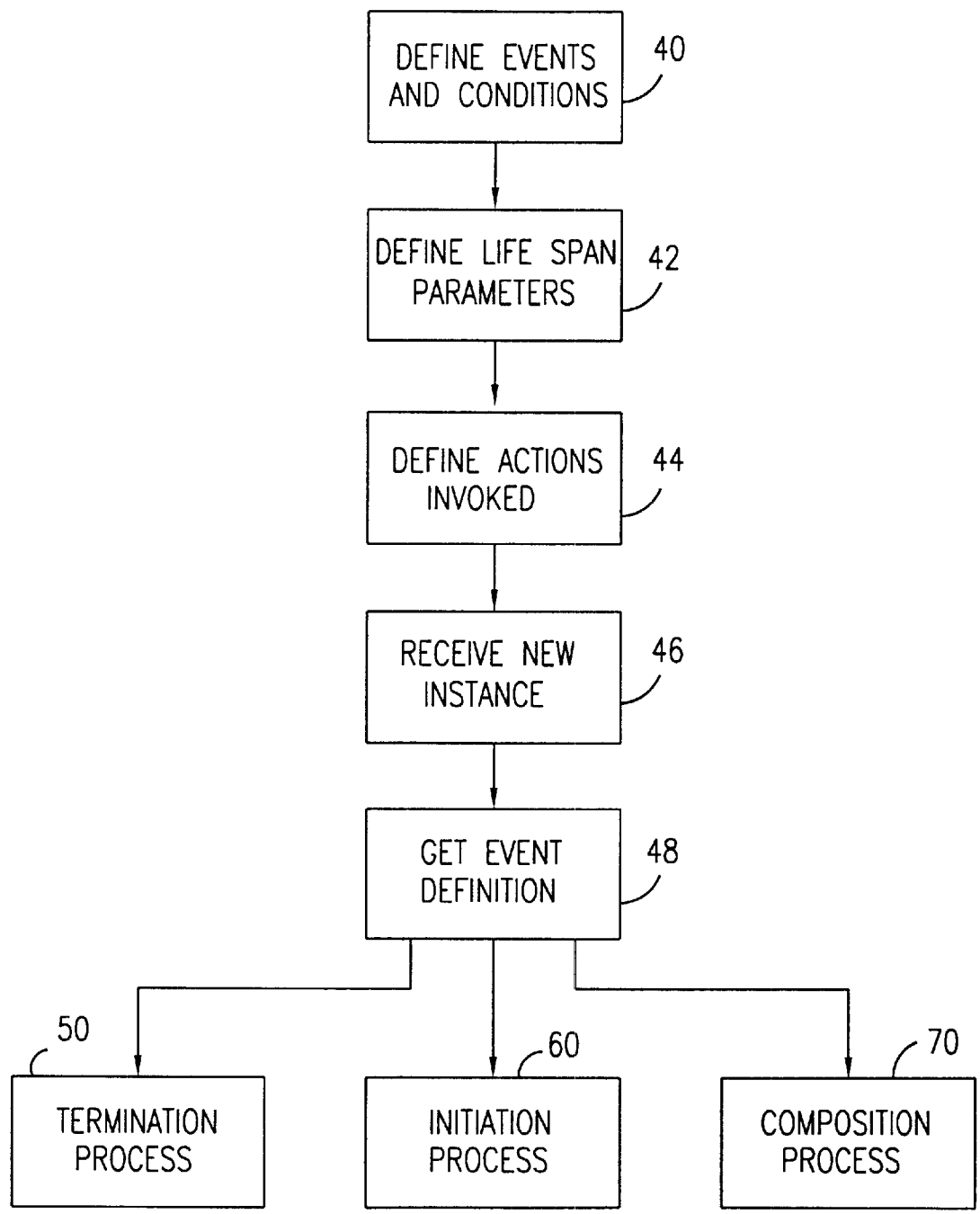
FIG. 2 is a flow chart that schematically illustrates a method for situation management, in accordance with a preferred embodiment of the present invention.

FIG. 2 is a flow chart that schematically illustrates a method of situation management using system 20, in accordance with a preferred embodiment of the present invention. The method includes definition of applicable rules, based on situations, lifespan parameters and actions defined at steps 40, 42 and 44, respectively. While these steps are shown, for the sake of simplicity of illustration, as separate, sequential functions, in practice they are generally performed together, in combination. After the rules have been defined, the system then receives event instances, at an instance reception step 48, and applies the rules to process the events in run-time at steps 48, 50, 60 and 70.

Table I below illustrates the syntax by which a situation is defined, in accordance with a preferred embodiment of the present invention:

TABLE I

SITUATION DEFINITION

Situation [Name] [General properties]
Operator
    From [operand list]
    Where [condition]
    Threshold [condition]
Key-by [key]
Initiators [list of initiator-expressions]
Terminators [list of terminator-expressions]
Attributes [attribute list]

The elements of this syntax are described in detail hereinbelow. Briefly, each situation has a name and general properties, such as a detection mode to be applied in detecting the situation (for example, immediate or deferred). The situation arises when a complex event occurs, as determined by an operator, which composes specified events, or operands. Table II, below, presents a list of such operators. "Where" and "threshold" specify conditions to be applied to certain attributes of the operand events. If a threshold condition is not satisfied, the event is not counted in composing the situation. "Where" conditions are generally applied to the situation as a whole, after the complex event has been composed. "Key-by" designates an attribute that is to be used to match different events. The "initiators" and "terminators" define a lifespan in which the situation must take place. "Attributes" lists the attributes to be returned in this particular situation, since not all of the attributes associated with the events involved in the situation are necessarily of interest.

Returning now to FIG. 2, at step 40, complex events are defined by means of event composition operators, which are applied to event types e1, e2, . . . , en. The event types typically refer to simple events, but the operators may also be applied to complex events. A list of operators is presented below in Table II, but it will be understood that this list is not exhaustive, and further operators may be added. It will also be noted that many of these event types are defined with reference to lifespans, which are preferably specified in a manner described hereinbelow, with reference to step 42.

TABLE II

COMPLEX EVENT COMPOSITIONS

| | |
|---|---|
| all (e1, . . . , en) | Occurs when an instance of each of the events in the list has been detected |
| before (e1, . . . , en) | Occurs when an instance of each of the events in the list has been detected, such that detection time (e1) < detection time (e2) < . . . < detection time (en). |
| atleast (N, e1, . . . , en) | Occurs when at least N instances of the specified events are detected. Optionally, only a single instance of each different event is counted. |
| nth (N, e1, . . . , en) | Occurs when the Nth instance of the specified events is detected. Optionally, only a single instance of each different event is counted. |
| atmost (N, e1, . . . , en) | Occurs when the number of instances of the specified events detected in a specified lifespan is less than or equal to N. This event is detected upon lifespan termination. Optionally, only a single instance of each different event is counted. |
| any (e1, . . . , en) | Occurs when any instance of the specified events is detected. |
| first (e1, . . . , en) | Occurs once during a specified lifespan, when the first instance of any of the specified events is detected, and returns the detected instance. |
| last (e1, . . . , en) | Occurs at the termination of a specified lifespan, returning the last detected instance of any of the specified events. |
| not (e1, . . . , en) | Occurs at the termination of a specified lifespan if there is no instance of any of the specified events that has occurred within the lifespan. |
| unless (e1, e2) | Occurs at the termination of a specified lifespan if there is an instance of e1 and no instance of e2 within the lifespan. |
| every (T) | Occurs every T time-units from the start of a specified lifespan. An instance of the event every (T) is generated irrespective of whether any other events occur during the lifespan. |
| at (e, T, MULT) | Occurs T time units after the occurrence of an instance of e. MULT is a decision variable that determines what to do if another instance of e occurs within time T of the previous instance. |

In addition to defining the composition of events that are to be detected, step 40 also includes defining the content of these events, i.e., the conditions that are to be applied in determining whether system 20 should react to the occurrence of the specified events. As noted hereinabove, the combination of the event composition with event content, or conditions, defines a situation. The conditions may be applied to the detected events either immediately or deferred to the end of a specified lifespan, as specified in the general properties of the situation. Table III presents an example useful in understanding the distinction between these two alternatives:

TABLE III

EVENTS AND CONDITIONS

| Time | Event type | Event instance ID | Attribute values |
|---|---|---|---|
| 1 | e1 | e11 | x = 5 |
| 2 | e2 | e21 | y = 7 |
| 3 | e2 | e22 | y = 4 |
| 4 | e1 | e12 | x = 12 |
| 5 | e1 | e13 | x = 4 |
| 6 | e2 | e23 | y = 11 |
| 7 | e2 | e24 | y = 10 |
| 8 | e2 | e25 | y = 8 |
| 9 | e2 | e26 | y = 7 |
| 10 | e2 | e27 | y = 12 |

As shown in the table, two arbitrary events, e1 and e2, defined, having respective attributes x and y. Assume a complex event is defined as before (e1, e2), with the condition that e1.x>e2.y. Over the lifespan defined by T=1, . . . , 10, there are 17 different compositions of an event e1i with a subsequent event e2j that will be detected as satisfying before (e1, e2). On the other hand, only one such composition, (e11, e22), satisfies the condition that e1.x>e2.y. Therefore, the condition is preferably evaluated immediately, in order to save system 20 the burden of storing all of the combinations until the end of the lifespan. Alternatively, in some cases, it may be desirable to store all of the candidate events and delay the content processing. Unlike the present invention, situation management tools known in the art process the conditions associated with events only after the entire event composition process is complete, and they do not offer this flexibility.

At step 42, initiators and terminators are defined for each of the lifespans to which situation detection is to be referred. Each of these initiators and terminators is itself an event, which may be either a simple or complex event and may have associated conditions, as well In other words, the initiator and terminator are also situations. Complex events used as initiators and terminators may be generated using the operators defined in Table II above. Furthermore, multiple instances of an initiator event can generate multiple, concurrent lifespans. Operators, referred to herein as correlation codes, are provided for defining how such multiple instances will be treated, as listed in Table IV.

TABLE IV

CORRELATION CODES

| | |
|---|---|
| Add | After a first initiator, each additional instance of the initiator event starts a separate lifespan for the same situation, while existing lifespans remain active. |
| Ignore | Any additional instance of the initiator event is ignored until the first lifespan has been terminated. (This is the default mode.) |
| Replace | Any additional instance of the initiator starts a new lifespan, while the preceding lifespan is terminated. |
| Override | Like replace, except that any situations that occurred during the preceding lifespan and whose processing was delayed, as described above, are discarded without detection. |

These correlation codes are used in writing the list of initiator-expressions in the syntax of Table I. For example, the expression "initiator e1 add, e2 ignore" in this syntax will cause a new lifespan to be added every time event e1 occurs, while a new lifespan will be added only at the first instance of event e2, while later occurrences of e2 will be ignored.

Terminator events are preferably parameterized in a similar fashion, and thus they may be applied differently to different lifespans. For example, when multiple lifespans of the same situation are open concurrently, a single terminator may terminate all or only some of them. Lifespans of different situations may also be grouped, or clustered, and terminated by a common terminator. It is also possible to define an expiration time for a given lifespan or group of lifespans, so that the lifespans end even in the absence of a terminator event.

More generally, a key may be defined for each lifespan, wherein the key is a combination of attributes such that for each distinct key value, a new lifespan is created. The key supports the ability of system 20 to match and partition events or lifespans by content. For example, consider the following events and associated attributes (listed as event:attributes) that might be used in managing a database of customer contacts:

Open-contact: new-contact, customer
Open-request: new-request, contact, priority
Assign-request: request, assigned agent
Reply-request: request, agent
Close-contact: closed-contact A key is defined for the purpose of matching events relating to a contact:

Key-contact open-contact.new-contact, open-request.contact, close-contact.closed-contact In order to group events that relate to the same contact, so as to define the lifespan of a given contact, for example, the events are filtered by their key value. In other words, a joint condition is imposed on the events that open-contact.new-contact, open-request.contact, and close-contact.closed-contact all have the same value, i.e., that they all refer to the same contact.

The application of the operators listed in Table II is preferably further refined using quantifiers, which indicate, when multiple instances of a given event occur during a lifespan, which of the instances to select. The quantifiers include "first," "each" and "last." The use of these quantifiers is illustrated by an example shown in Table V.

TABLE V

USE OF EVENT QUANTIFIERS

| Time | Event type | Event instance ID |
|---|---|---|
| 1 | e1 | e11 |
| 2 | e1 | e12 |
| 3 | e2 | e21 |
| 4 | e2 | e22 |
| 5 | e1 | e13 |
| 6 | e2 | e23 |

The operator "before(first e1, first e2)" will return (e11, e21) at time T=3. The situation may further be quantified by its general properties so that it returns this result either immediately, or only upon termination of the lifespan at T=7. On the other hand, "before(first e1,each e2)" will return (e11, e21), (e11, e22) and (e11, e23). It is also possible, however, to quantify the situation so that event instances are consumed after use. In this case, "before(first e1, each e2)" would return (e11, e21), (e12, e22) and (e13, e23). It may further be specified that instances that are skipped without being consumed are ignored, rather than saved for subsequent use. In this case, "before(first e1, each e2)" would return only (e11, e21) and (e13, e23), since e12 is initially skipped, leaving e22 with no match. Threshold conditions may also be applied to the events, as illustrated in Table I.

At step 44, the actions to be taken by system 20 for each situation in each corresponding lifespan are defined. The situations defined at steps 40, 42 and 44 are stored in tables, indexed by event type. Incoming events are evaluated against the table values, as described hereinbelow. Upon completion of steps 40, 42 and 44, system 20 is prepared to receive and process events and react to the corresponding situations. At step 46, system 20 receives and begins processing of event instances in accordance with the rules that have been defined.

At step 48, each event instance that arrives is referred to a global event table, which maps the instance to a corresponding event type, and to an event definition table, which classifies the event type as an initiator, terminator and/or part of one or more composite events. The tables are part of a group of data structures that are defined for the purpose of situation and lifespan processing. These data structures, which are described further hereinbelow, are listed in Table VI.

TABLE VI

DATA STRUCTURES

| | |
|---|---|
| Global tables | |
| Event table | Maps event descriptions to event types. |
| Key table | Maps key descriptions to keys. Each entry represents a different key, with its details for a certain situation. |
| Cluster table | Maps cluster descriptions to clusters. A cluster is a group of lifespans having the same key, referred to as their "global key." Each entry in this table represents a different cluster, with its details for a certain situation. |
| Event definition - for each event type: | |
| Initiator set | Set of initiators that depend on this event type. |
| Terminator set | Set of terminators that depend on this event type. |
| Sibling set | Set of composite events in which this type of event participates. |
| Operand list | List of the operands that are associated with this event type. |
| Attribute list | List of the attributes that are associated with this event type. |
| Key list | List of the keys that pertain to this event type. |
| Terminator - list of data objects for each defined terminator event, including: | |
| Terminator description | |
| Cluster description | Description of the cluster to which a lifespan terminated by this terminator belongs. |
| Conditions | Conditions that a possible terminator must satisfy in order to terminate the lifespan. |
| Quantifier | First, last, each. |

TABLE VI-continued

DATA STRUCTURES

| | |
|---|---|
| Termination type | Terminate, discard. |
| Initiator - list of data objects for each defined initiator event, including: | |
| Initiator description | |
| Cluster description | Description of the cluster to which a lifespan initiated by this initiator belongs. |
| Conditions | Conditions that a possible initiator must satisfy in order to initiate the lifespan. |
| Correlation code | Add, ignore, override or replace. |
| Cluster - for each cluster of lifespans: | |
| Key value table | Mapping of key values to a linked list of lifespans. For each global key value, the table lists lifespans that have this global key value and thus belong to the same cluster. The global key value determines the grouping of lifespans and their respective initiators. |
| Links set | Set of lifespans that are associated with this cluster. |
| Lifespan | |
| Key value table | Mapping of local key values to data used for composition of candidates (event instances) with that key value. For each local key value, the table lists the operands that have this local key value in the given lifespan. |

Figure 3:
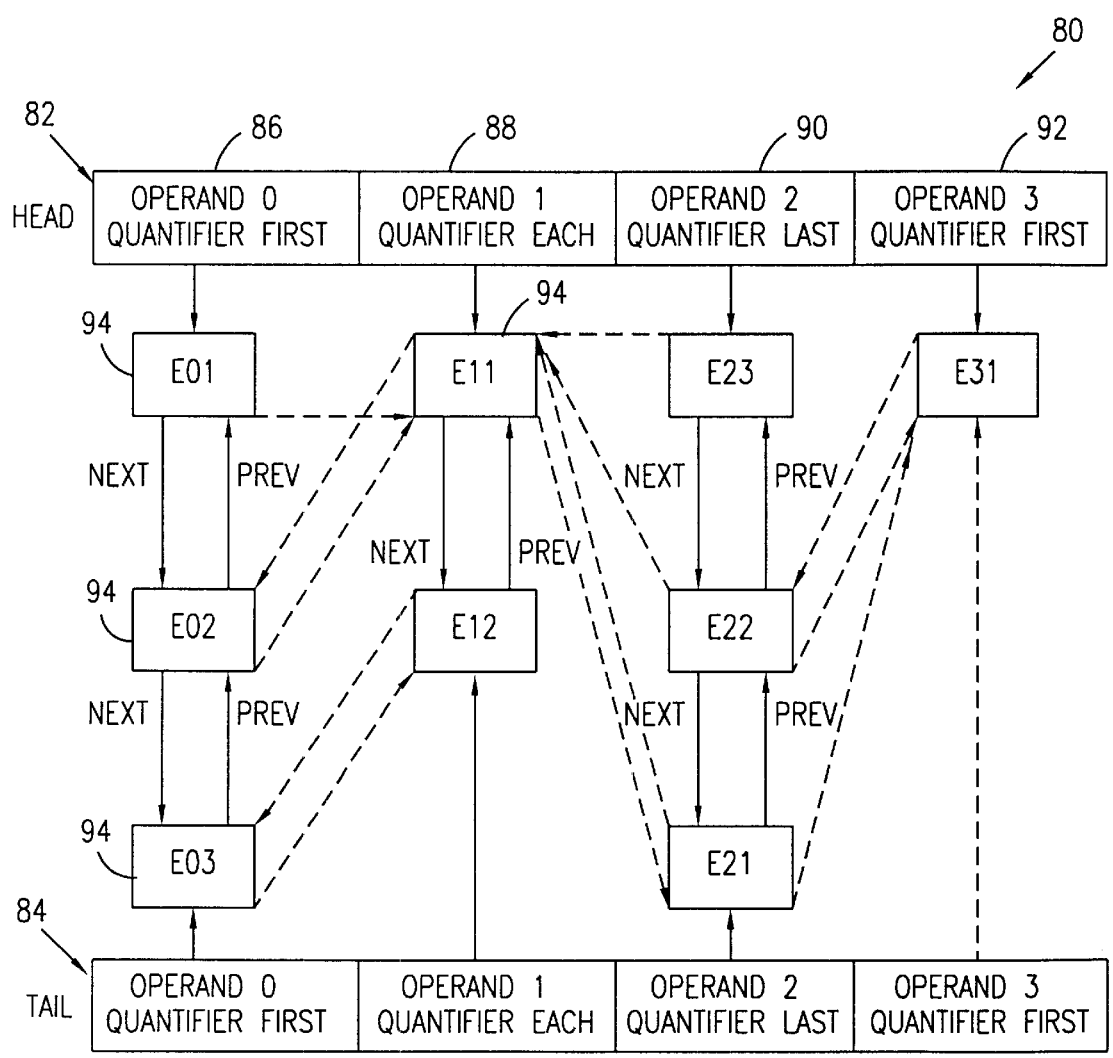
FIG. 3 is a graph that schematically illustrates a candidate list of event instances generated in carrying out the method of FIG. 2, in accordance with a preferred embodiment of the present invention.

FIG. 3 is a graph that schematically illustrates a data structure 80 into which system 20 maps the event instances that it receives, in accordance with a preferred embodiment of the present invention. Typically, a structure of this sort is defined for every situation that is included in the rules defined at step 40 (so that in some cases an event instance may be entered in multiple different structures). Each instance that meets the criteria of a given situation is a candidate 94 to be a part of the situation to which the system is to respond. For this reason, structure 80 is referred to as a candidate list. The mapping is performed based on the key value table, as described in detail hereinbelow with reference to FIGS. 7A and 7B. The candidates are stored in this structure in order to identify and preserve their order for purposes of processing.

Structure 80 includes a head 82 and a tail 84, with candidates 94 categorized by event type and arranged in sequence between the head and tail. Each of the sequences is identified with an operand 86, 88, 90 or 92, corresponding to the particular event type and an operator and quantifier associated therewith in the corresponding situation, defined at step 40. The order of the operands in the data structure is determined by the order in which the operands are listed in the situation definition, as shown in Table I. The order of the candidates in the sequence is determined by the quantifier: For operands having the quantifier "first" or "each," such as operands 0, 1 and 3, the candidates are listed in ascending order from head to tail. For operands having the quantifier "last," such as operand 2, the candidates are listed in reverse order.

For each candidate 94, structure 80 also includes a pointer from that candidate to another candidate in the sequence of the next higher operand that arrived immediately after that candidate, and to the candidate in the sequence of the next lower operand that arrived immediately before that candidate. These pointers are illustrated as dashed arrows in FIG. 3, assuming that the event instances arrived in the following order: e01, e02, e11, e21, e22, e31, e23, e02, e12. Thus, for example, e11 points down to e02, which is the preceding instance of e0, and points up to e21, which is the succeeding instance of e2. The information stored in structure 80 in this fashion is used subsequently in composing complex events that depend on the sequence of the arriving event instances.

Depending on the event definitions extracted from the tables at step 48, each event instance received by system 20 is referred to one or more of the following processes:

A lifespan termination process, at step 50.

A lifespan initiation process, at step 60.

A composition process, at step 70, wherein the event is combined with other event instances in its sibling set to compose complex events.

Each of these processes is explained in turn in the description that follows.

FIG. 4 is a flow chart that schematically illustrates initiation process 60, in accordance with a preferred embodiment of the present invention. At a step 100, for each possible initiating event, the process begins to loop through the data objects in the initiator data object list. As described in Table VI, each of these data objects is associated with a particular lifespan. For each data object, the process checks at a step 102 to determine whether the initiator meets the conditions in the table to initiate the corresponding lifespan. If not, the process goes on to the next data object in the list at a step 104.

If the conditions are satisfied, then process 60 continues to check, at a step 106, using the current initiator data object, to which cluster this lifespan belongs, and to determine whether the cluster is already listed in the global cluster table. If the cluster exists in the table, then the new lifespan is added to the cluster at a step 108. Otherwise, a new cluster is created, at a step 110, and is added to the table. Next, at a step 112, the process adds links between the current cluster and other clusters, if such links do not already exist, and adds these links to the link set of the cluster (Table VI). Then, at a step 114, the global key value for the cluster is obtained from the key value table of the cluster and is used to determine which lifespans may be opened by this particular initiator.

Once the cluster for the particular lifespan has been set up and linked to other clusters, process 60 determines whether to initiate a new lifespan in response to the current initiator, or to ignore the initiator, at a step 116. The decision is based on the correlation code associated with this initiator, as listed in the data object list. If the code is "ignore," then at a step 118, it is determined whether there already exists a lifespan of this type in the cluster. If so, the current initiator is discarded, and the process goes on to the next initiator instance, back at step 100. If there is no lifespan of this type, however, a new lifespan is initiated, at a step 120, and is added to the cluster at a step 122. On the other hand, if the code is "add," then a new lifespan is initiated and added to the cluster regardless of whether another lifespan already exists. When the code is "override" or "replace," the new lifespan is likewise initiated and added, while the preceding lifespan is terminated.

Figure 5A:
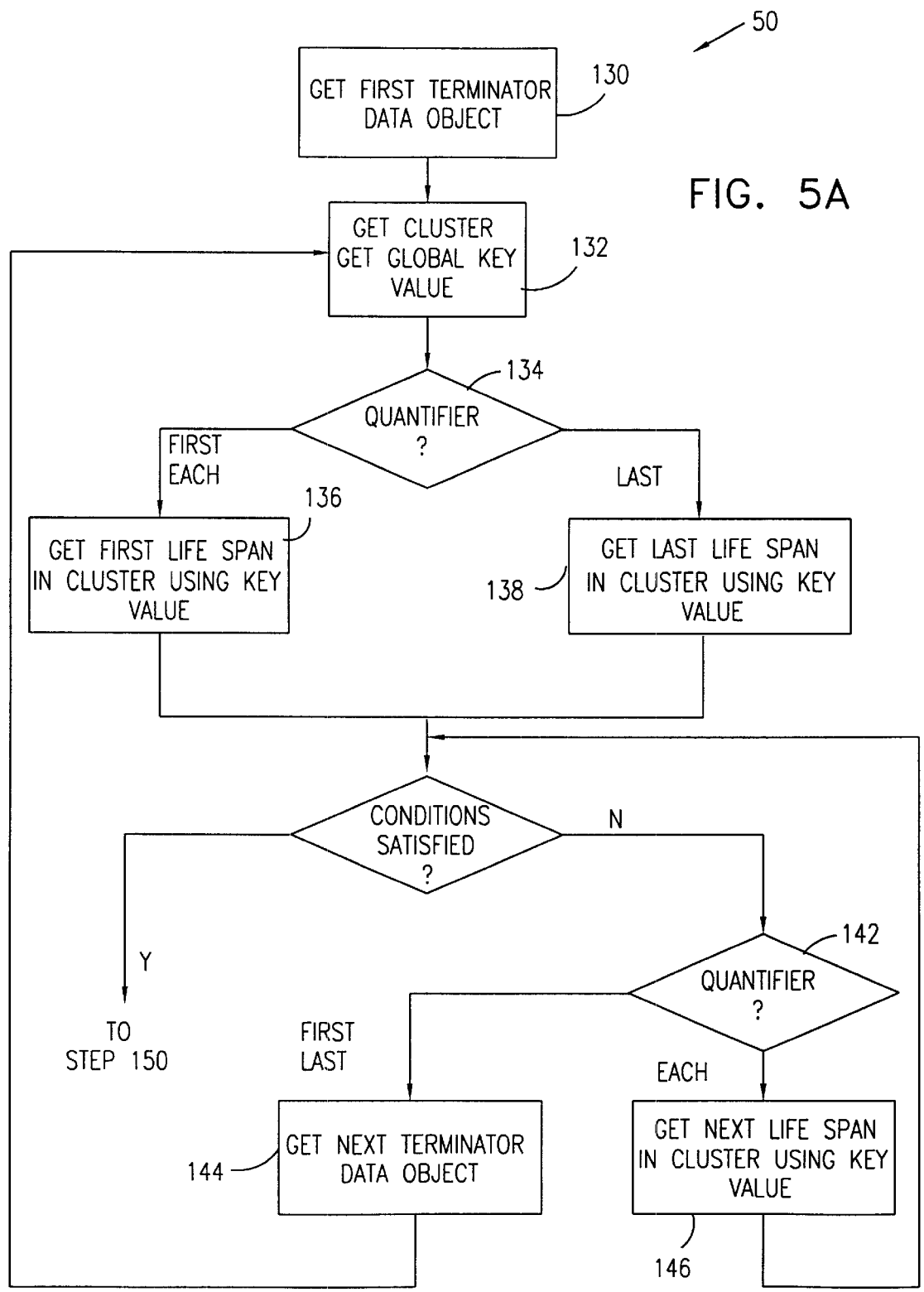
FIGS. 5A and 5B are flow charts that schematically illustrate a method for detecting the termination of a lifespan, in accordance with a preferred embodiment of the present invention.
Figure 5B:
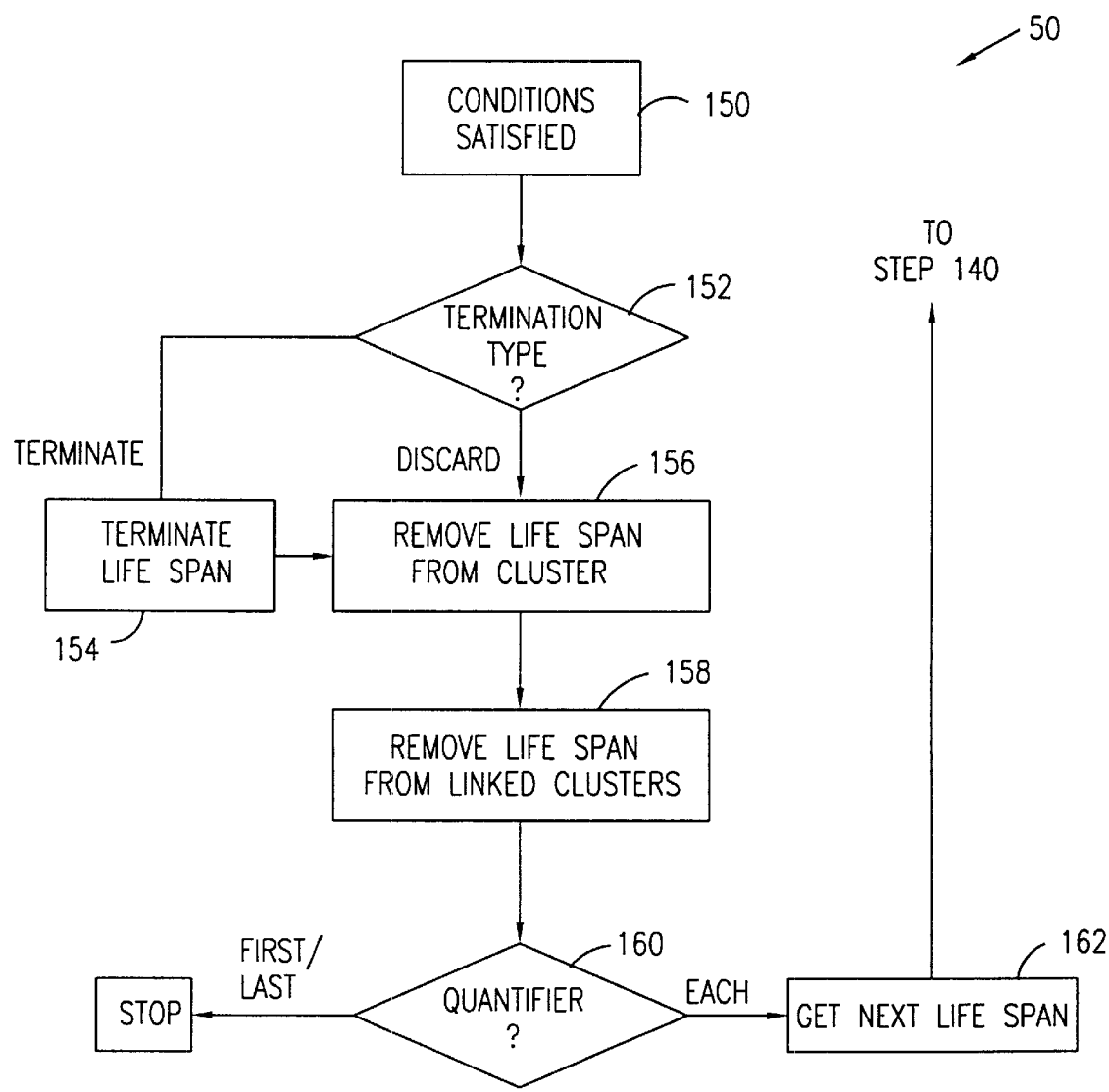

FIGS. 5A and 5B are flow charts that schematically illustrate termination process 50, in accordance with a preferred embodiment of the present invention. At a step 130, for each possible terminating event, the process begins to loop through the data objects in the terminator data object list. As described in Table VI, each of these data objects is associated with a particular cluster to which the lifespan belongs. At a step 132, the process retrieves the identification of the cluster, as well as the global key value of the cluster. The process then checks the terminator data object, at a step 134, to determine the quantifier associated with the terminating event. The lifespans in the cluster that have the appropriate key value are retrieved for evaluation. If the quantifier of the terminator is "first" or "each," then at a step 136, the terminating event is evaluated against the lifespans in the cluster starting with the first lifespan. Otherwise, if the quantifier is "last," the terminating event is evaluated against the lifespans beginning with the last lifespan in the cluster, at a step 138.

At a step 140, the terminator under consideration is evaluated against the termination conditions associated with the first or last lifespan, as appropriate. If these conditions are not satisfied, then the next step performed by process 50 again depends on the terminator's quantifier, which is evaluated at a step 142. If the quantifier is "first" or "last," then there are no further lifespans to evaluate for this terminator. In this case, the process goes on to the next terminator data object, at a step 144, and returns to evaluate this new data object at step 132. Otherwise, if the quantifier is "each," the process gets the next lifespan in the cluster, at a step 146, and proceeds to determine whether the terminator satisfies the conditions at step 140.

On the other hand, whenever the termination conditions at step 140 are satisfied, process 50 goes on to the next stage of terminator evaluation at a step 150 (FIG. 5B). The action of the process at this stage depends on whether the termination type of this terminator, which is read from the data object list at a step 152, is "terminate" or "discard." If the type is "discard," then the current lifespan is deleted from its cluster at a step 156, and any situations in the lifespan that have not yet been processed are discarded, as well. On the other hand, if the type is "terminate," then at a step 154, any situations remaining in the lifespan are processed, and the results of this processing are returned, before proceeding to step 156. At a step 158, the lifespan is also removed from any clusters that are linked to the current cluster.

The actions of process 50 following step 158 are again determined by the quantifier associated with the current terminator, which is further evaluated at a step 160. If the quantifier is "first" or "last," then the process ends or, alternatively, returns to get the next terminator data object at step 144. If the quantifier is "each," process 50 goes on to get the next lifespan in the cluster, at a step 162, and then returns to process this lifespan at step 140.

Figure 6:
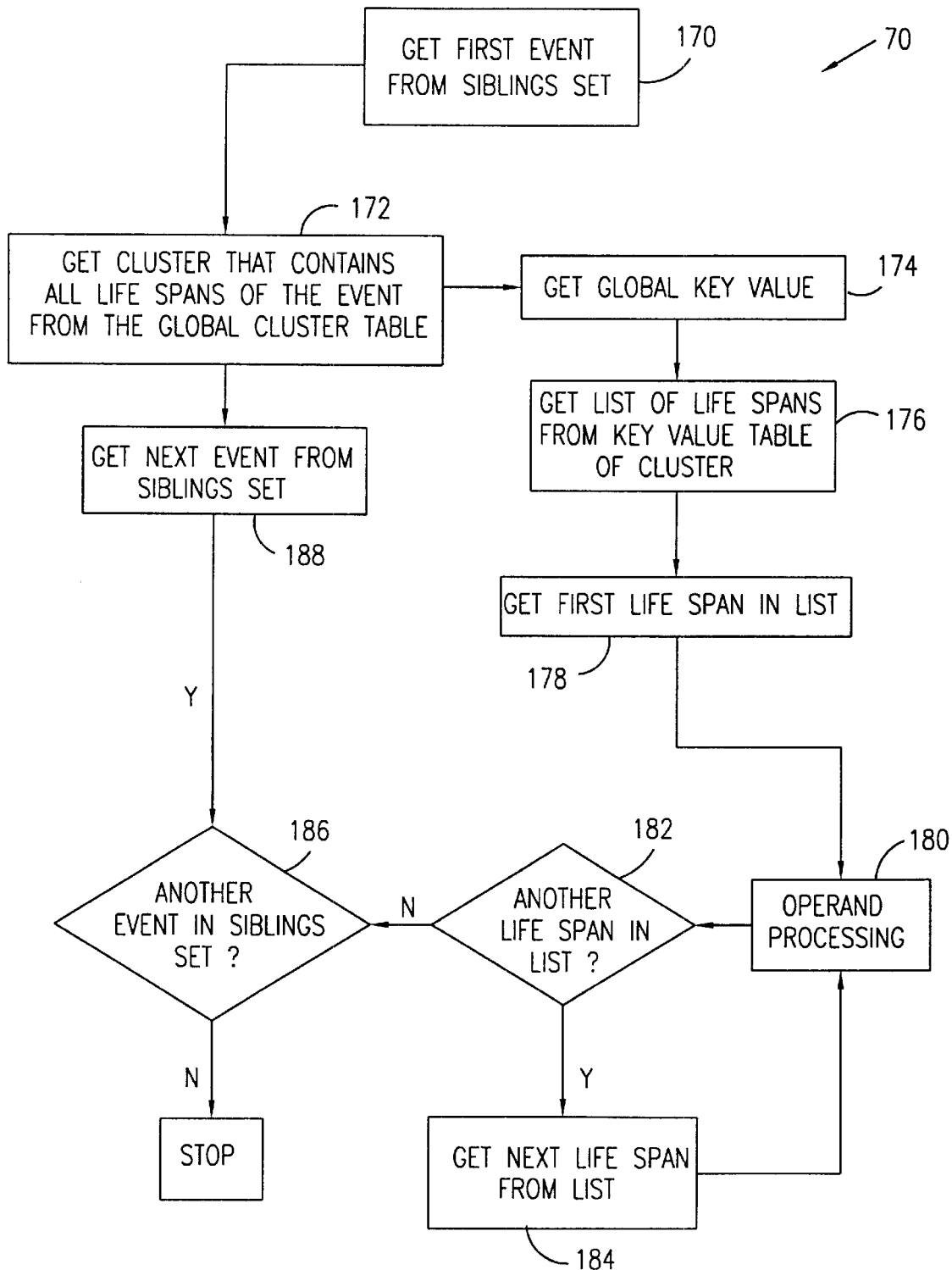
FIG. 6 is a flow chart that schematically illustrates a method for event composition filtering, in accordance with a preferred embodiment of the present invention.

FIG. 6 is a flow chart that schematically illustrates event composition process 70, in accordance with a preferred embodiment of the present invention. For each instance of a given event type, process 70 loops on the events in the sibling set of the event type. The sibling set includes the complex events of which the given event type can be a component, as listed in the event definition table (in Table VI). Process 70 begins with a first event in the sibling set at a step 170. At step 172, the process gets the cluster that contains all lifespans of this first event from the global cluster table. At a step 174, the global key value of the first event is retrieved from the list of keys associated with the event type. This key is used, at a step 176, to get a list of the lifespans relevant to the first event from the key value table of the cluster.

Process 70 now loops on the lifespans in the list, beginning with a first lifespan at a step 178. Operand processing is applied to the first event in the context of this first lifespan, at an operand processing step 180, which is described in detail hereinbelow. At step 180, it is determined whether the situation associated with the current event instance meets all of the conditions associated with the first event in the sibling set in the first lifespan of the cluster. Subsequently, if it is determined, at a step 182, that there is another lifespan in the list that is relevant to the first event, the process gets this next lifespan, at a step 184, and operand processing step 180 is repeated.

When all of the lifespans in the list have been processed, at a step 186, process 70 determines whether there are any further events remaining in the sibling set of the input event. If so, the next event from the sibling set is retrieved, at a step 188, and the process returns to step 172 to evaluate this next event. Otherwise, processing of this instance ends, and the next instance is selected for processing.

Figure 7A:
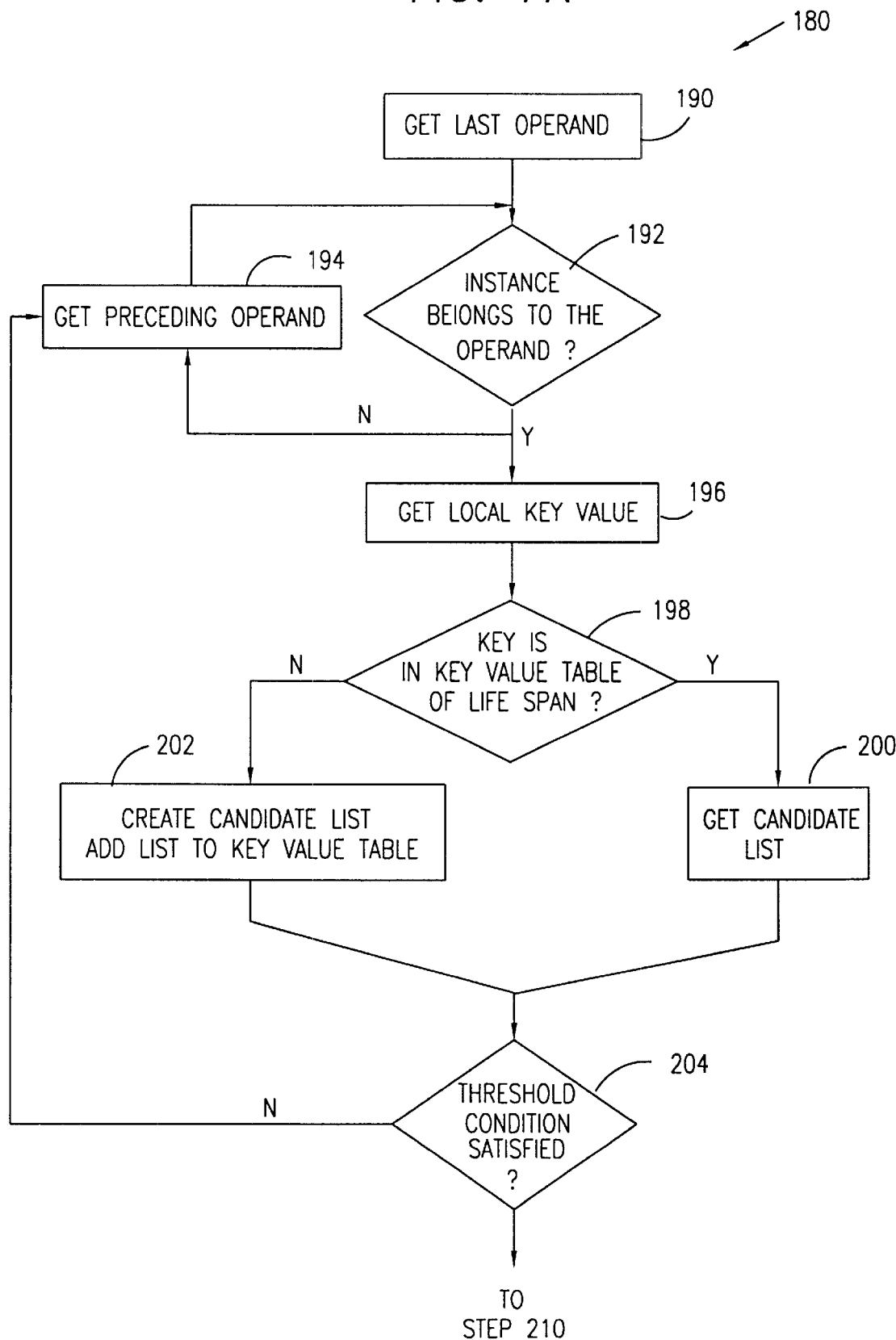
FIGS. 7A and 7B are flow charts that schematically illustrate a method of operand processing for use in event composition filtering, in accordance with a preferred embodiment of the present invention.
Figure 7B:
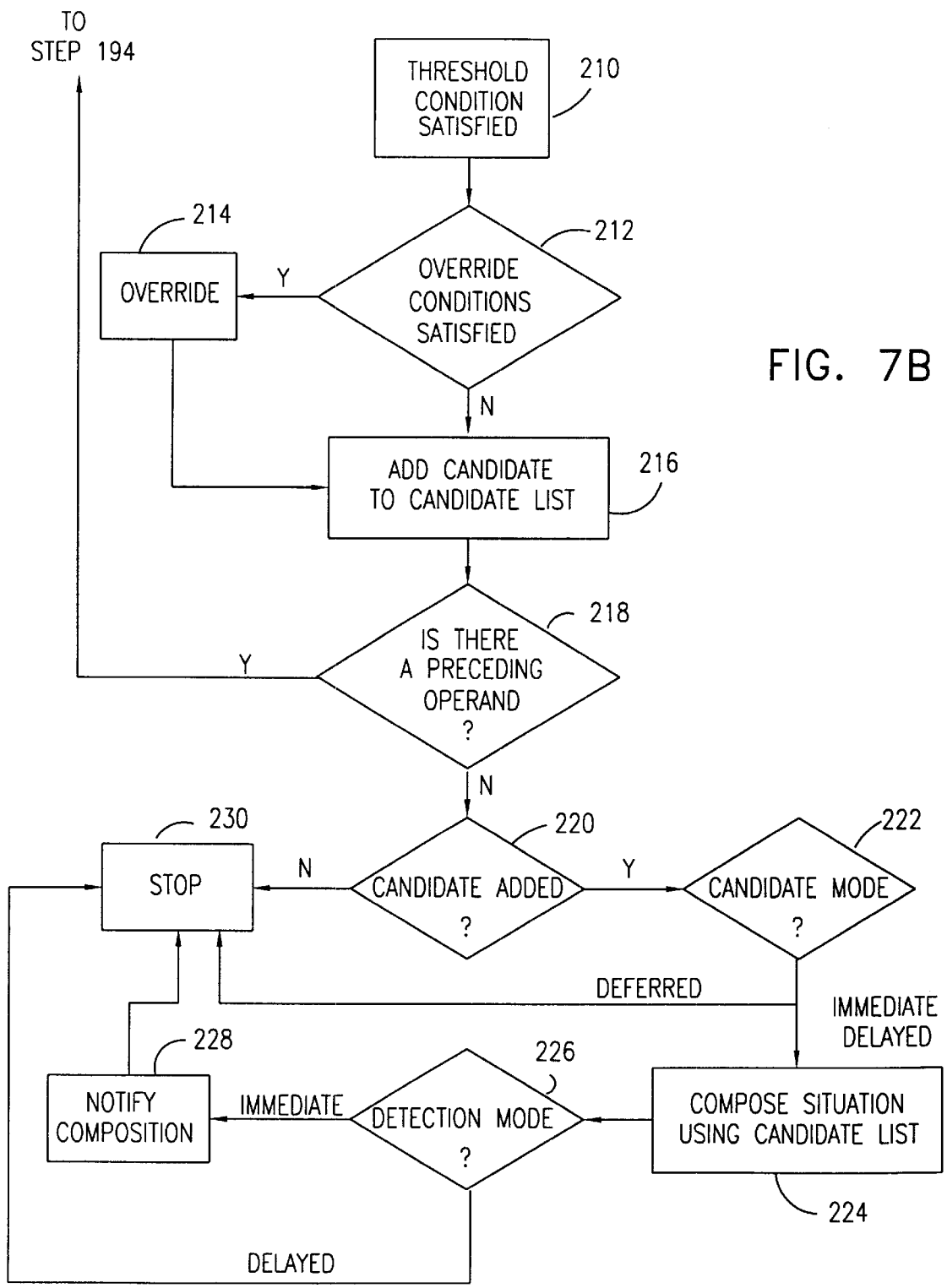

FIGS. 7A and 7B are flow charts that schematically illustrate details of operand processing step 180, in accordance with a preferred embodiment of the present invention. This step loops on the operands of the complex event that is currently selected from the sibling set for evaluation by process 70, beginning with the last operand of the event, at a step 190. For each of the operands, beginning with the last one, the current event instance is evaluated, at a step 192, to determine whether this instance belongs to the operand. If not, the preceding operand of the complex event is taken, at a step 194, and step 192 is repeated until the operand corresponding to the current instance is found.

A local key value for the current event instance is retrieved from the key list table of the complex event at a step 196. This key value is evaluated against the key value table of the lifespan that is currently being processed (as selected in step 178 or 184, FIG. 6), at a step 198. If the local key value already exists in the lifespan key value table, the candidate list indicated by this key value is retrieved, at a step 200. A sample candidate list is shown in FIG. 3 and described with reference thereto. Otherwise, at a step 202, a new candidate list is created, and the key value is added to the key value table of the current lifespan.

The current event instance is evaluated against predefined conditions to determine whether it should be added to the new or existing candidate list. At a condition evaluation step 204, threshold conditions are applied to the instance. This step and the succeeding steps are described in greater detail below with reference to FIG. 8. If the conditions are not satisfied, the process loops to the preceding operand at step 194. If the conditions are met, the evaluation proceeds at a step 210 and, at a step 212, override conditions are applied to the instance. Such conditions apply to the quantifiers "first" and "last," as described hereinabove, and cause event instances other than the instance indicated by the quantifier to be ignored, or overridden. If the override conditions are satisfied, however, the current event instance is passed through, at a step 214. The current event instance, which is now known to meet the threshold conditions associated with the complex event, is accordingly added to the candidate list, at a step 216.

Evaluation of the current event instance, in steps 192 through 216, continues against the remaining operands of the complex event. Thus, at a step 218, as long as there is another operand preceding the one against which the instance has just been evaluated, the process loops back to step 194, until all of the operands have been exhausted.

Next, at a step 220, it is determined whether any candidates have been added to the candidate list of the current lifespan. If not, step 180 is finished, and process 70 returns to step 182 (FIG. 6). If a candidate has been added, it is then determined, at a step 222, whether to complete composition of the situation immediately, and thus to invoke the appropriate reaction, or to defer the composition. If the complex event is flagged in the general properties of the situation (Table I) for "deferred" composition, the process returns to step 182, and composition of the situation takes place only after the current lifespan has expired. Otherwise, if the event is flagged for "immediate" or "delayed" composition, the situation is composed immediately based on the candidate list, at a step 224. At this step, it is determined whether the instances that have been entered in the candidate list satisfy the requirements of the operators that define the complex event, as well as meeting the remaining "where" conditions that define the situation to which system 20 is required to react.

At a step 226, it is determined whether the detection mode of the complex event is "immediate" or "delayed." If it is immediate, then system 20 reacts to the situation as required, at a step 228, typically by notifying a user of the system that the situation has occurred. Preferably, a situation manager process, running on processor 22, determines and carries out the appropriate response to the situation. Otherwise, if the detection mode is delayed, the system reaction takes place only later, typically after the end of the current lifespan. In either case, the process continues at step 182.

Figure 8:
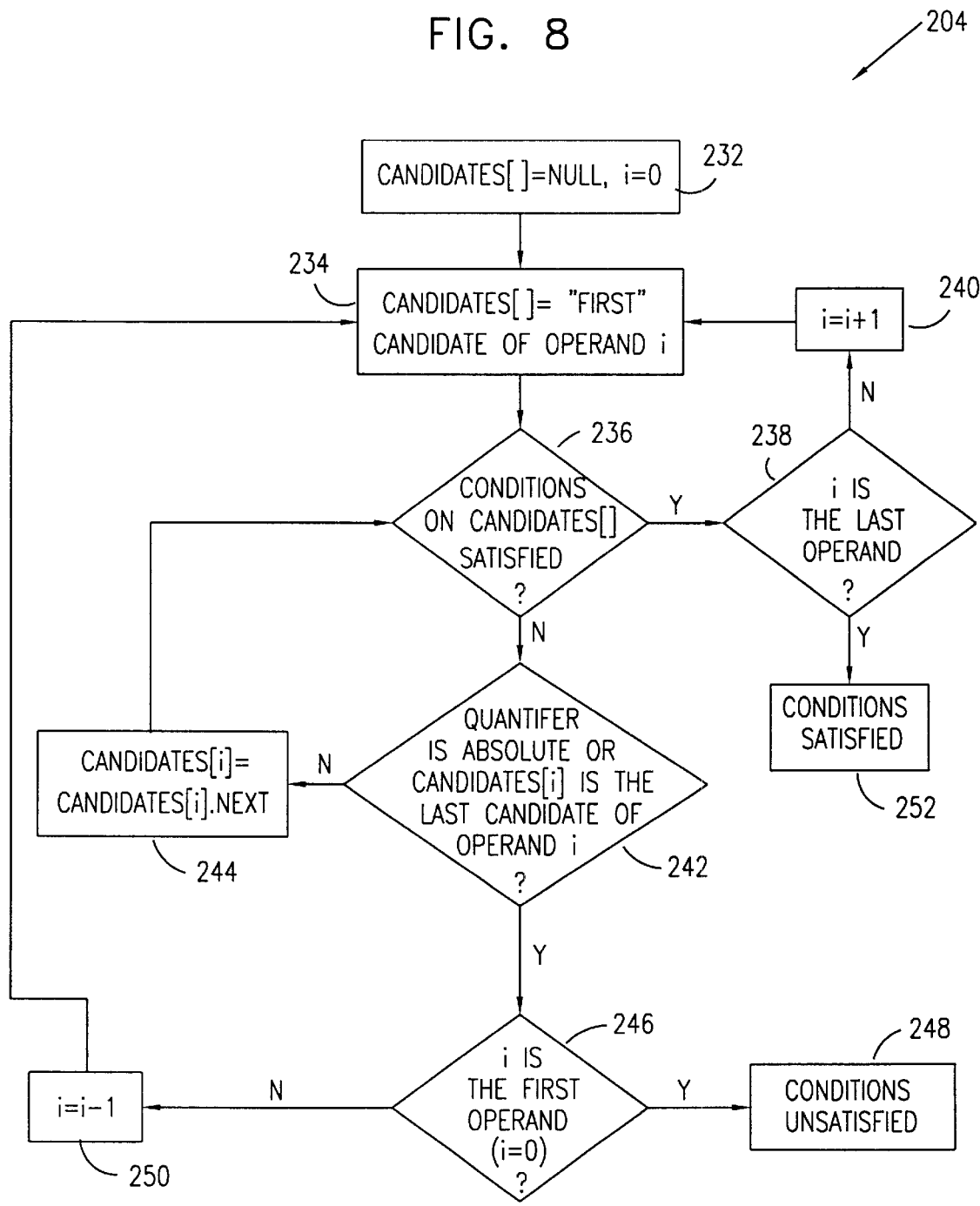
FIG. 8 is a flow chart that schematically illustrates a method for evaluating the conditions of a situation, in accordance with a preferred embodiment of the present invention.

FIG. 8 is a flowchart that schematically illustrates details of the process of event composition shown generally in FIGS. 7A and 7B, in accordance with a preferred embodiment of the present invention. The evaluation is applied to the candidate instances in the current candidate list (FIG. 3), beginning with operand i=0, at a step 232. The "first" candidate belonging to the operand is retrieved, at a step 234, wherein the "first" candidate may actually be the last instance of the operand if the operand quantifier is "last." This candidate is evaluated against the specified conditions of the situation at a step 236. If the conditions are satisfied, then the evaluation proceeds to the next operand, at a step 240, until all of the operands have been evaluated. Once it is determined, at a step 238, that the last of the operands has been evaluated, and the conditions on all of the candidates are satisfied, the evaluation is completed, at a step 252, and the process returns to step 210 (FIG. 7B).

On the other hand, if the conditions of the situation are not satisfied at step 236, the process must determine, at a step 242, whether to go on evaluating other candidates in the list. If the quantifier associated with the terminator of the current lifespan is absolute (i.e., either "first" or "last"), and the evaluation failed on the first operand (i=0), as determined at a step 246, then the conditions of the situation are deemed to be unsatisfied by the current candidate list, at a step 248. In this case, the process returns to step 194 (FIG. 7A). A similar outcome occurs if the quantifier is "each," and all of the candidates of the first operand have been exhausted without finding one that satisfies the conditions.

If, however, at step 242, the quantifier is "each," and further candidates remain in the list of the present operand, then the next candidate down the list is substituted at a step 244, and step 236 is repeated. Moreover, if the quantifier is "each," then even if the list of candidates of the present operand is exhausted, but the present operand is not the first one (i≠0), it will be determined at step 246 that there may still be a combination of candidates that satisfies the conditions. To search for this combination, at a step 250, i is decremented, and evaluation resumes at step 234 with the next candidate down the list for operand i-1.

System 20, embodying the principles described hereinabove, may be adapted for use in a wide range of situation management contexts. Some examples include:

Active database management systems, as described in the Background of the Invention.

Fault and emergency alarm systems, such as systems for detecting medical emergencies in critical care monitoring, or systems for detecting and diagnosing faults in computers and communication networks.

Systems for facilitating collaboration and communications among groups of co-workers by alerting the workers to one another's activities, as in "publish/subscribe" protocols, synchronous event servers and groupware.

Automated transaction processing systems, particularly in the area of financial services.

Those skilled in the art will recognize further applications of the present invention, in these and other areas of real-time and automated systems.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for situation management implemented by a computer, comprising:

specifying a composite event as a combination of two or more predefined component events, each such component event comprising an occurrence external to the computer that is detected by the computer;

defining a rule, which causes a reaction to be invoked upon an occurrence of the composite event subject to a given condition;

receiving at least first and second instances of the component events before invoking the reaction;

evaluating the first instance subject to the condition, so as to determine whether the first instance can satisfy the rule, before evaluating the second instance; and responsive to evaluating the first instance subject to the condition, determining that the composite event has occurred and invoking the reaction.

2. A method according to claim 1, wherein receiving the first and second instances comprises receiving instances of first and second component events of the composite event.

3. A method according to claim 2, wherein determining that the composite event has occurred comprises composing the composite event using the first and second instances, subject to the given condition.

4. A method according to claim 1, wherein receiving the first and second instances comprises receiving two instances of the same component event.

5. A method according to claim 4, wherein determining that the composite event has occurred comprises, when the first instance does not satisfy the rule, evaluating the second instance subject to the condition and determining that the composite event has occurred responsive to evaluating the second instance.

6. A method for situation management implemented by a computer, comprising:

specifying a lifespan, having an initiation associated with an occurrence of an initiator event and a termination associated with an occurrence of a terminator event, the initiator and terminator events comprising occurrences external to the computer that are detected by the computer;

attaching a condition to at least one of the initiator and terminator events, such that at least one of the initiation and the termination of the lifespan takes place subject to the condition;

defining a rule, which causes a reaction to be invoked upon an occurrence of an invoking event during the lifespan;

receiving event instances, including at least one instance of each of the initiator event, invoking event and terminator event;

evaluating the instances of the events subject to the condition so as to determine that the invoking event has occurred during the lifespan; and responsive to evaluating the instances, invoking the reaction.

7. A method according to claim 6, wherein at least one of the initiator and terminator events is a complex event, composed of a plurality of component events.

8. A method according to claim 6, wherein evaluating the instances of the events subject to the condition comprises evaluating the at least one instance of the initiator event subject to the condition, so as to determine whether to begin the lifespan, before receiving the instance of the invoking event.

9. A method according to claim 6, wherein defining the rule comprises specifying whether to evaluate one or more instances of the invoking event that occur during the lifespan immediately, or to evaluate the one or more instances only upon receiving the terminator event, and wherein evaluating the instances of the events subject to the condition comprises deciding, responsive to the rule, when to evaluate the one or more instances of the invoking event subject to the condition.

10. A method according to claim 9, wherein evaluating the instances of the events subject to the condition comprises, responsive to deciding to evaluate the one or more instances of the invoking event immediately, evaluating a first one of the instances of the invoking event subject to the condition before evaluating any subsequent one of the event instances.

11. A method according to claim 6, wherein receiving the instances comprises receiving a plurality of instances of the initiator event, and wherein evaluating the instances comprises associating two or more respective lifespans with two or more of the plurality of initiator events, and evaluating the at least one instance of the invoking event with respect to each of the two or more lifespans.

12. A method according to claim 6, wherein defining the rule comprises specifying, for a case in which multiple instances of the invoking event occur during the lifespan, which of the multiple instances to evaluate.

13. A method according to claim 12, wherein specifying which of the multiple instances to evaluate comprises specifying that a first or last instance in the lifespan is to be evaluated.

14. A method according to claim 12, wherein specifying which of the multiple instances to evaluate comprises specifying that each of the instances is to be evaluated.

15. A method for situation management implemented by a computer, comprising:

specifying a lifespan, defined by an initiator event and a terminator event, the initiator and terminator events comprising occurrences external to the computer that are detected by the computer;

defining a rule, which causes a reaction to be invoked upon the occurrence of an interim event during the lifespan;

receiving multiple instances of the initiator event before the terminator event has occurred;

opening multiple instances of the lifespan, responsive to the multiple instances of the initiator event;

receiving an instance of the interim event;

evaluating the instance of the interim event with respect to at least two of the multiple instances of the lifespan, so as to determine that the invoking event has occurred during at least one of the instances of the lifespan; and responsive to evaluating the instance of the interim event, invoking the reaction.

16. A method according to claim 15, wherein opening the multiple instances of the lifespan comprises opening at least two instances of the lifespan such that the at least two instances of the lifespan are open concurrently.

17. A method according to claim 16, and comprising receiving an instance of the terminator event, wherein evaluating the instance of the interim event comprises determining that the at least two of the instances of the lifespan are terminated by the same instance of the terminator event.

18. A method according to claim 16, and comprising receiving one or more instances of the terminator event, wherein evaluating the instance of the interim event comprises determining that the at least two of the instances of the lifespan are terminated by different, respective ones of the instances of the terminator event.

19. A method according to claim 15, wherein receiving the multiple instances of the initiator event comprises receiving first and second instances of the initiator event, and wherein opening the multiple instances of the lifespan comprises opening a first instance of the lifespan opened responsive to the first instance of the initiator event, and comprising closing the first instance of the lifespan responsive to the second instance of the initiator event.

20. Situation management apparatus, comprising:

a memory, which stores a specification of a composite event as a combination of two or more predefined component events, each such component event comprising an occurrence external to a computer that is detected by the computer, and which stores a definition of a rule, which causes a reaction to be invoked upon an occurrence of the composite event subject to a given condition; and a processor, which is coupled to read the specification and the rule from the memory, and which is configured to receive at least first and second instances of the component events and, when the at least first and second instances of the component events are received before invoking the reaction, to evaluate the first instance subject to the condition, so as to determine whether the first instance can satisfy the rule, before evaluating the second condition, thus to determine that the composite event has occurred and invoke the reaction responsive thereto.

21. Apparatus according to claim 20, wherein the memory further stores a database, and wherein at least one of the component events comprises a change in a record in the database.

22. Apparatus according to claim 20, wherein the processor is configured to receive at least one of the component events via a network.

23. Situation management apparatus, comprising:

a memory, which stores a specification of a lifespan, having an initiation associated with an occurrence of an initiator event and a termination associated with an occurrence of a terminator event, the initiator and terminator events comprising occurrences external to a computer that are detected by the computer, together with a condition attached to at least one of the initiator and terminator events, such that at least one of the initiation and the termination of the lifespan takes place subject to the condition, and which stores a definition of a rule, which causes a reaction to be invoked upon an occurrence of an invoking event during the lifespan; and a processor, which is coupled to read the specification, condition and rule from the memory, and which is configured to receive event instances, including at least one instance of each of the initiator event, the invoking event and the terminator event, and to evaluate the instances of the events subject to the condition so as to determine that the invoking event has occurred during the lifespan and invoke the reaction response thereto.

24. Apparatus according to claim 23, wherein the memory further stores a database, and wherein at least one of the component events comprises a change in a record in the database.

25. Apparatus according to claim 23, wherein the processor is configured to receive at least one of the component events via a network.

26. Situation management apparatus, comprising:

a memory, which stores a specification of a lifespan, defined by an initiator event and a terminator event, the initiator and terminator events comprising occurrences external to a computer that are detected by the computer, and which stores a definition of a rule, which causes a reaction to be invoked upon the occurrence of an interim event during the lifespan; and a processor, which is coupled to read the specification and the definition from the memory, and which is configured to receive multiple instances of the initiator event before the terminator event has occurred and to open multiple instances of the lifespan, responsive to the multiple instances of the initiator event, and further to receive an instance of the interim event and to evaluate the instance of the interim event with respect to at least two of the multiple instances of the lifespan, so as to determine that the invoking event has occurred during at least one of the instances of the lifespan and invoke the reaction responsive thereto.

27. Apparatus according to claim 26, wherein the memory further stores a database, and wherein at least one of the component events comprises a change in a record in the database.

28. Apparatus according to claim 26, wherein the processor is configured to receive at least one of the component events via a network.

29. A computer software product, comprising program instructions stored in a computer-readable medium, which instructions, when read by a computer, cause the computer to read a specification of a composite event as a combination of two or more predefined component events, each such component event comprising an occurrence external to the computer that is detected by the computer, and to read a definition of a rule, which indicates a reaction to be invoked upon an occurrence of the composite event subject to a given condition, and which instructions further cause the computer, when it receives at least first and second instances of the component events before invoking the reaction, to evaluate the first instance subject to the condition, so as to determine whether the first instance can satisfy the rule, before evaluating the second condition, and responsive to evaluating the first instance subject to the condition, to determine that the composite event has occurred and to invoke the reaction responsive thereto.

30. A product according to claim 29, which is adapted for use in active database management.

31. A computer software product, comprising program instructions stored in a computer-readable medium, which instructions, when read by a computer, cause the computer to read a specification of a lifespan, having an initiation associated with an occurrence of an initiator event and a termination associated with an occurrence of a terminator event, the initiator and terminator events comprising occurrences external to the computer that are detected by the computer, and further to read a condition attached to at least one of the initiator and terminator events, such that at least one of the initiation and the termination of the lifespan is to take place subject to the condition, and also to read a definition of a rule, which indicates a reaction to be invoked upon an occurrence of an invoking event during the lifespan, and which instructions further cause the computer, when it receives event instances including at least one instance of each of the initiator event, invoking event and terminator event, to evaluate the instances of the events subject to the condition so as to determine that the invoking event has occurred during the lifespan and to invoke the reaction responsive thereto.

32. A product according to claim 31, which is adapted for use in active database management.

33. A computer software product, comprising program instructions stored in a computer-readable medium, which instructions, when read by a computer, cause the computer to read a specification of a lifespan, defined by an initiator event and a terminator event, the initiator and terminator events comprising occurrences external to the computer that are detected by the computer, and to read a definition of a rule, which causes a reaction to be invoked upon the occurrence of an interim event during the lifespan, and which instructions further cause the computer, when it receives multiple instances of the initiator event before the terminator event has occurred, and further receives an instance of the interim event, to open multiple instances of the lifespan, responsive to the multiple instances of the initiator event, and to evaluate the instance of the interim event with respect to at least two of the multiple instances of the lifespan, so as to determine that the invoking event has occurred during at least one of the instances of the lifespan and to invoke the reaction responsive thereto.

34. A product according to claim 33, which is adapted for use in active database management.

* * * * *